United States Patent [19]

Dobson, Jr. et al.

[11] Patent Number: 5,728,652
[45] Date of Patent: Mar. 17, 1998

[54] BRINE FLUIDS HAVING IMPROVED RHEOLOGICAL CHARACTERSITICS

[75] Inventors: James W. Dobson, Jr., Houston; Ronald Lee Rock, Sugarland, both of Tex.

[73] Assignee: Texas United Chemical Company, LLC., Houston, Tex.

[21] Appl. No.: 512,675

[22] Filed: Aug. 25, 1995

Related U.S. Application Data

[63] Continuation-in-part of Ser. No. 386,443, Feb. 10, 1995, Pat. No. 5,616,541.

[51] Int. Cl.$^6$ ....................................................... C09K 7/00
[52] U.S. Cl. ........................... 507/145; 507/110; 507/209; 507/271; 507/925
[58] Field of Search ................................. 507/211, 212, 507/213, 110, 111, 209, 145, 271, 925

[56] References Cited

U.S. PATENT DOCUMENTS

| | | | |
|---|---|---|---|
| 4,427,556 | 1/1984 | House et al. | 507/110 |
| 4,822,500 | 4/1989 | Dobson, Jr. et al. | 507/212 |
| 5,514,644 | 5/1996 | Dobson | 507/111 |
| 5,616,541 | 4/1997 | Dobson, Jr. et al. | 507/145 |

*Primary Examiner*—Sharon Gibson
*Assistant Examiner*—Valerie Fee
*Attorney, Agent, or Firm*—Roy F. House

[57] ABSTRACT

The invention provides brine based well drilling and servicing fluids which exhibit relatively thermally stable rheological and filtration characteristics. The fluids comprise a brine, an amorphous silica viscosifier, a biopolymer viscosifier, a fluid loss control additive, and a bridging agent. By utilizing both a silica viscosifier and a biopolymer viscosifier to provide the desired rheological characteristics, the fluids have enhanced thermal stability thus maintaining their suspension and hole cleaning properties over an extended temperature range.

10 Claims, No Drawings

BRINE FLUIDS HAVING IMPROVED RHEOLOGICAL CHARACTERSITICS

This application is a continuation-in-part of patent application Ser. No. 08/386,443 filed Feb. 10, 1995, now U.S. Pat. No. 5,616,541.

BACKGROUND OF THE INVENTION

In the drilling of well bores penetrating subterranean formations, drilling fluids are generally circulated through the well bores to remove cuttings therefrom and accomplish other purposes. Most drilling fluids are comprised of suspended particles of hydrated clay in water and weighting materials such as barite are frequently combined with the drilling fluids to increase the densities thereof. Various additives are also commonly utilized in drilling fluids to impart desired properties thereto, such as to bring about low fluid loss from the drilling fluids to subterranean formations in contact therewith. However, once a well bore penetrates a subterranean formation containing desired hydrocarbon fluids, insoluble materials in the drilling fluid such as clay and barite can be damaging to the formation. That is, a filter cake or sheath of such insoluble material can form on the face of the formation and some solids of the filter cake can penetrate into the formation which in turn can result in a permanent reduction in the permeability and hydrocarbon producing ability of the formation.

In order to help prevent damage to producing formations during the drilling and completion of well bores penetrating such formations and during subsequently carried out workover procedures, brines have heretofore been utilized in lieu of drilling fluids containing insoluble solids. The brines are non-damaging because the salts contained therein which provide density to the brines are dissolved, and no solids are placed in contact with the formation thereby. Because such drilling, completion, and workover brines do not contain undissolved solids, they are commonly referred to as "clear brines."

In operations carried out in well bores penetrating subterranean formations containing fluids under high pressures, the brines utilized must have very high densities, e.g., densities in the range of from about 9.0 to 21.5 pounds per gallon, in order to prevent the pressurized fluids from blowing out of the wellbore. These brines typically contain KCl, NaCl, CaCl$_2$, NaBr, CaBr$_2$, ZnCl$_2$, ZnBr$_2$, sodium formate and potassium formate, or combinations of such salts, and are of relatively high cost.

Because of the high cost of high density drilling, completion and workover brines, they are usually recovered, filtered, and reused in well servicing operations. The loss of such brines is expensive and certain brines are not compatible with certain formation brines causing damaging precipitation therein, and as a result, fluid loss reduction procedures and additives have heretofore been utilized with high density brines. These include increasing the viscosity of the brines by combining hydratable viscosifiers therewith such as hydroxyethylcellulose and derivatized polysaccharides. While combining such viscosifiers with high density brines has resulted in the reduction of fluid loss, the disadvantages are that relatively large quantities of the viscosifiers are required, difficulties are often encountered in dissolving, and hydrating the viscosifiers in high density brines, especially brines containing zinc bromides; and the viscosity produced is often lost or greatly lessened when the brines are used in relatively high temperature or low pH environments.

U.S. Pat. Nos. 4,175,042 and 4,822,500, incorporated herein by reference for all purposes, disclose drilling, workover and completion fluids comprising a saturated brine solution in which a water soluble salt, which is not soluble in the saturated brine, of a particular size range is suspended in the saturated brine along with suitable polymeric viscosity and suspension additives and suitable fluid loss control agents. Representative saturated brines may contain one or more salts such as KCl, NaCl, CaCl$_2$, ZnCl$_2$, KBr, NaBr, CaBr$_2$, ZnBr$_2$, Na$_2$SO$_4$, Na$_2$CO$_3$, K$_2$CO$_3$, and NaHCO$_3$. Representative water soluble, particulate sized salts are KCl, NaCl, CaCl$_2$, CaBr$_2$, Na$_2$SO$_4$, Na$_2$CO$_3$, K$_2$CO$_3$, and NaHCO$_3$. Representative viscosity and suspension additives are xanthan gum, cellulose ethers, and guar gum derivatives. Representative fluid loss control additives are: calcium, chrome, or ferrochrome lignosulfonates; carboxymethylcellulose; and starches such as corn, potato, and tapioca, and their derivatives. U.S. Pat. No. 4,822,500 discloses that xanthan gum and a particular epichlorohydrin crosslinked hydroxypropyl starch synergistically combine in the saturated brine to provide excellent suspension and fluid loss control. Such fluids having a saturated sodium chloride base brine have been eminently successful, and are a preferred fluid for drilling in hydrocarbon bearing formations, such as in "horizontal drilling."

SUMMARY OF THE INVENTION

It has now been found that brine based, well drilling and servicing fluids having excellent rheological and filtration characteristics, and good thermal stability, are provided by the fluids of this invention.

The fluids of this invention comprise a brine, an amorphous silica viscosifier, a biopolymer viscosifier, a fluid loss control additive, and a bridging agent. Optionally, but preferably, the fluids also contain an alkaline buffer.

The low solids, high density fluids of this invention are useful as drilling fluids for oil and gas, particularly when drilling into hydrocarbon-containing formations, workover fluids, and completion fluids. The fluids provide excellent filtration properties providing extremely thin filter cakes. This provides more readily removable filter cakes, easier well clean-up, and better hydrocarbon production. The excellent low shear rate viscosity (rheological properties) of the fluids provide excellent suspension and hole cleaning properties. By utilizing both a silica viscosifier and a biopolymer viscosifier to provide the rheological characteristics desired, the fluids have better thermal stability thus maintaining their suspension and hole cleaning properties over an extended temperature range.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The fluids of this invention comprise an amorphous silica viscosifier, a biopolymer viscosifier, a fluid loss control additive, and a bridging agent dispersed or suspended in a brine (i.e., an aqueous liquid having one or more water soluble salts dissolved therein).

The preferred brine contains a salt selected from the group consisting of calcium bromide, zinc bromide, calcium chloride, and mixtures thereof. Such a brine may also contain other water soluble salts dissolved therein. The concentration of calcium bromide, zinc bromide, calcium chloride, and other water soluble salt may be any concentration up to saturation in the brine. Generally the density of the brine will be from about 1200 kg/m$^3$ to about 2400 kg/m$^3$ (10 lbm/gal to 20 lbm/gal). As indicated hereinbefore, such brines are well known in the art. Other brines which may be used in the fluids of this invention contain sodium formate or potassium formate dissolved therein.

The amorphous silica viscosifier, as known and accepted in the art, are derived either by a liquid phase or a vapor process. Silicas obtained by the vapor process are called fumed or pyrogenic silicas. Products obtained by the liquid process are categorized as silica gels and precipitated silicas. Thus, there are three distinct types of synthetic silicas on the market:

1. Pyrogenic Silicas

Pyrogenic or fumed silicas are prepared by reacting silicon tetrachloride vapor with oxygen and hydrogen gas at high temperatures. These products have high external surface areas and differ from other silicas (e.g., gels, precipitated silicas) prepared from the liquid phase process. Cabot and DeGussa are two suppliers of pyrogenic silicas.

2. Silica Gels

Silica gels are of two types: hydrogels and aerogels. Hydrogels are prepared by reacting a soluble silicate such as sodium silicate with strong sulfuric acid. The gel is washed salt free, dried, micronized, and then classified. Aerogels are prepared from crude hydrogels by displacing its water content with an alcohol. The alcohol is then recovered by heating the gel in an autoclave.

Aerogels are lighter and fluffier than hydrogels because the shrinkage of the gel structure is avoided during the drying process. Gels have very large surface areas, generally in the range of 300–1,000 m$^2$/g and high porosities. Silica gels are offered, e.g., by W.R. Grace and Company under the trademark "Syloid;" by Monsanto, under the trademark "Santocel;" and by Glidden, under the trademark "Silicron."

3. Precipitated Silicas

Precipitated silicas are produced by the de-stabilization and precipitation of silica from soluble silicate by the addition of a mineral acid and/or acidic gases. The reactants thus include an alkali metal silicate and a mineral acid, such as sulfuric acid or an acidulating agent such as $CO_2$.

When the acidification agent is added to the alkali metal silicate at a certain point during the process, the silica starts precipitating. The addition of the acidification agent is continued until the $M_2O$ of the alkali metal silicate (M being the alkali metal) of the ultimate silica is less than about 1% by weight. Thus, as a general rule, the acidification agent is added to the alkali metal silicate to neutralize the alkali portion bound to the silicate anion. The reaction slurry is filtered and washed free of reaction by-product, which is the alkali metal salt of the acidification agent. The filter cake is dried and milled to obtain a silica of desired degree of fineness.

Silica, to be an effective thickening agent must be of a fine size. By fine size is meant that the silica must be in a particle size range of less than 100 millimicrons. These silica materials may either initially be of this small particle size, or be capable of being easily deaggregated or disintegrated to this small particle size when mixed into the liquid to be thickened. Very useful silica thickeners have generally been produced by pyrogenic techniques. These silicas are the thermal decomposition product of silica tetrachloride. A prime characteristic of these pyrogenic silica materials is that they are loosely aggregated to about a 0.5 to 5 micron size, but which when mixed into a liquid readily deaggregate to less than 100 millimicron sized particles.

Silica thickening agents have also been produced by aerogel processes. Generally these are not as good in thickening liquids as pyrogenic silicas.

U.S. Pat. No. 4,216,113 discloses a modified hydrogel process which produces silica thickening agents of a particle size range of 0.5 to 5 micrometers. It is readily deaggregated under conventional mixing to particle sizes of less than 100 millimicrons. A commercially available precipitated silica viscosifier is HI-SIL T-600, a product of PPG Industries, Inc. It has an average ultimate particle size of 21 millimicrons and an average agglomeration size of 1.6 microns (micrometers).

The pyrogenic, fumed silicas are preferred.

The biopolymer viscosifier useful in the practice of this invention is preferably a xanthomonas gum (xanthan gum). Xanthomonas gum is available commercially. It is a widely used viscosifier and suspending agent in a variety of fluids. Xanthomonas gum can be made by the fermentation of carbohydrate with bacteria of the genus Xanthomonas. Representative of these bacteria are *Xanthomonas campestris*, *Xanthomonas phaseoli*, *Xanthomonas mulvacearn*, *Xanthomonas carotoe*, *Xanthomonas traslucens*, *Xanthomonas hederae*, and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of xanthomonas gum will have somewhat different solubility and viscosity properties. Xanthomonas gums useful in the practice of the present invention are relatively hydratable xanthomonas gums.

The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi, on appropriate fermentation mediums may be used in the fluids of the present invention provided that they impart the desired synergistic thermally stable rheological characteristics thereto. This can be readily determined by one skilled in the art in accordance with the teachings of this specification.

The term "biopolymer" is intended to mean an excellular polysaccharide of high molecular weight, in excess of 500,000, produced by fermentation of a carbohydrate source by the action of bacteria or fungi. Representative microorganisms are the genus Xanthomonas, Pseudomonas, Agrobacterium, Arthrobacter, Rhizobium, Alcaligenes, Beijerincka, and Sclerotium. A succinoglucan type polysaccharide produced by microorganisms such as NCIB 11592 and NCIB 11883 is commercially available.

Polymeric fluid loss control additives used in well drilling and servicing fluids are so-called water soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

The preferred polymeric fluid loss control additives used in the invention are the starch ether derivatives such as hydroxyethyl starch, hydroxypropyl starch, dihydroxypropyl starch, carboxymethyl starch, hydroxyalkyl carboxymethyl starch, and cationic starches, and the slightly crosslinked derivatives of these starch ethers, most preferably the hydroxypropyl ether derivative of starch.

Most preferably the polymeric fluid loss control additive is a starch ether derivative which has been slightly crosslinked, such as with epichlorohydrin, phosphorous oxychloride, soluble trimetaphosphates, linear dicarboxylic acid anhydrides, N,N$^1$-methylenebisacrylamide, and other reagents containing two or more functional groups which are able to react with at least two hydroxyl groups. The preferred crosslinking reagent is epichlorohydrin. Generally the treatment level is from about 0.005% to 0.1% of the starch to give a low degree of crosslinking of about one crosslink per 200 to 1000 anhydroglucose units. The crosslinking may be undertaken before or after the starch is derivatized. Additionally, the starch may be modified by acid or enzyme hydrolysis or oxidation, to provide a lower molecular weight, partially depolyermized, starch polymer for derivatization. Alternatively, the starch ether derivative may be modified by acid hydrolysis or oxidation to provide a lower molecular weight starch ether derivative. The book entitled "Modified Starches: Properties and Uses," by O. B. Wurzburg, 1986 (CRC Press, Inc., Boca Raton, Fla., U.S.A.) is an excellent source for information in the preparation of starch derivatives.

The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid. The bridging agent must not be appreciably soluble in the liquid used to prepare the fluid. Representative water soluble salts include sodium chloride, potassium chloride, calcium chloride, sodium formate, potassium formate, sodium bromide, potassium bromide, calcium bromide, sodium acetate, potassium acetate, and the like. Representative acid soluble materials include calcium carbonate, dolomite (calcium/magnesium carbonate), iron carbonate, and other carbonates. The preferred bridging agents are sodium chloride and calcium carbonate.

The particle size distribution of the bridging agent must be sufficient to bridge across and seal the pores in the subterranean formation contacted by the fluid. Generally, as disclosed in U.S. Pat. No. 4,175,042, a preferred particle size range is from about 5 microns to about 800 microns with greater than about 5% by weight of the particles being coarser than 44 microns. It has been found, however, that the addition of a supplementary bridging agent having a particle size such that at least 90% of the particles thereof are less than 10 microns and the average particle size is from about 3 to about 5 microns decreases the fluid loss of the fluids of this invention and reduces the concentration of polymer required to impart the desired degree of fluid loss control to the fluids of this invention.

When the bridging agent is water soluble, it is preferred that the brine be saturated with respect to the bridging agent, or at least substantially saturated such that less than 10% by weight of the bridging agent is dissolved in the brine.

Optionally, but preferably, the fluids of this invention contain an alkaline buffer.

The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like. In accordance with this invention, the fluids should exhibit pH's in the range from about 3.0 to about 8.0. Brines containing zinc bromide should have a pH less than about 6.0 as is well known in the art. Although the actual pH's of highly concentrated salt solutions cannot be accurately read using a pH meter, the relative pH's of several different highly concentrated salt solutions may be accurately compared. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner. Where it is necessary to adjust the measured pH, the adjustment may be carried out at substantially any time in accordance with this invention.

The fluids may also contain a low molecular weight polar additive. The low molecular weight polar additives useful in this invention have a molecular weight less than about 400 and contain one or more polar groups per molecule selected from the group consisting of hydroxyl, amino, and mixtures thereof. These include alcohols, alkylene glycols, polyalkylene glycols, alkyl ethers of alkylene glycols and polyalkylene glycols, amines, alkylene diamines, polyalkylene polyamines, piperazines, aminoalcohols, and the like. The preferred polar additives have the empirical formula

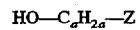

$$HO-C_aH_{2a}-Z$$

where a is an integer from 1 to about 5, and Z is a radical selected from the group consisting of H, and $(OC_bH_{2b})_nOR$, where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5, and y is an integer from 1 to 3. Preferably a=2 or 3, and $Z=(OC_bH_{2b})_nOR$. Thus it is preferred that the water soluble hydroxy-containing polar additive contain at least two hydroxyl groups or at least one hydroxyl and at least one ether group or radical within its molecular structure.

The polar additive may serve several functions in the fluids of this invention. The polar additive may serve to scavenge (react with) dissolved oxygen in the fluids, may serve to bond between the surface hydroxyls on the particles of the silica viscosifier, and may serve to activate the polymeric fluid loss control additive and biopolymer in zinc bromide-containing brines.

The concentrations of the additives in the fluids of this invention are as follows:

|  | Useful Concentration Range | | Preferred Concentration Range | |
|---|---|---|---|---|
|  | kg/m³ | lbm/bbl | kg/m³ | lbm/bbl |
| Silica Viscosifier | 1.4–14.3 | 0.5–5 | 2.8–11.4 | 1–4 |
| Biopolymer Viscosifier | 0.7–8.6 | 0.25–3 | 1.4–5.7 | 0.5–2 |
| Fluid Loss Control Additive | 8.5–42.8 | 3–15 | 14.3–28.6 | 5–10 |
| Bridging Agent | 28.6–143 | 10–50 | 57–114 | 20–40 |
| Alkaline Buffer | 0–28.6 | 0–10 | 1.4–14.3 | 0.5–5 |
| Polar Additive | 0–42.8 | 0–15 | 0–28.6 | 0–10 |

The weight ratio of silica viscosifier to biopolymer viscosifier should generally be from 0.5–8, preferably from about 1.0 to about 3.0.

The preferred fluids of this invention are characterized as having a Low Shear Viscosity of at least 3000 centipoise (3 Pa·s), a Spurt Loss no greater than 2 cubic centimeters, and a thirty (30) minute Fluid Loss less than 10 cubic centimeters. The Low Shear Viscosity (LSV) for purposes of this invention is obtained using a Brookfield Model LVTDV-I viscometer having a number of 2 or 3 spindle at 0.3 revolutions per minute (shear rate of 0.063 sec$^{-1}$). The LSV is indicative of the suspension properties of the fluid, the larger the LSV, the better is the suspension of solids in the fluid. The Spurt Loss and Fluid Loss for purposes of this invention are obtained by a modified API filtration test. Thus to an API high temperature filtration cell with removable end cages is added a screen having 44 micron openings. There is then added 67.5 grams of a sized sand to produce a 1.5 cm sand bed. The sized sand has a particle such that all of the sand passes through a screen having 177 micron openings and is retained on a screen having 125 micron openings. The fluid to be tested is poured along the inside edge of the filtration cell so as not to disturb the sand bed. The filtration test is then conducted for 30 minutes at the desired temperature under a pressure differential of 17.59 kg/cm² (250 pounds per square inch) supplied by nitrogen. The spurt loss is measured as the amount of fluid expelled from the filtration cell until the flow of fluid is reduced to drops. The fluid loss is measured as the total amount of fluid collected in 30 minutes.

The fluids of this invention can be prepared by mixing together the brine, fluid loss control additive, silica, biopolymer, and bridging agent, and the alkaline buffer and polar additive, if used, in any order. However, it is preferred that the fluid loss control additive and biopolymer first are hydrated in a brine having a density no greater than about 1704 kg/m³ containing the polar additive, if any. Subsequently, the remaining brine having the density required to obtain a fluid having the desired density, the silica, the bridging agent, the alkaline buffer, if used, and any additional desired additives are mixed therein.

The fluids of this invention can thus be prepared preferably by dispersing the fluid loss control additive and biopolymer in a brine having a density no greater than about 1704 kg/m³ containing the polar additive, if any, adding the remaining brine having the density required to obtain a fluid having the desired density, adding the silica viscosifier, the bridging agent, and the alkaline buffer if used, and mixing thoroughly.

In order to more completely describe the invention, the following nonlimiting examples are given. In these examples and this specification, the following abbreviations may be used: API=American Petroleum Institute; FLCA= fluid loss control additive; NC=no control, complete loss of fluid; No.=number; sec.=seconds; min.=minutes; lbm/gal= pounds per U.S. gallon; bbl=42 gallon barrel; lbm/bbl= pounds per barrel; g.=grams; cc=cubic centimeters; m=meter; ° C.=degrees Centigrade; Pa=pascal; %=percent by weight; kg/m³=kilograms per cubic meter; Tr=Trace; PV=plastic viscosity in pascal seconds; YP=yield point in pascals; GS=10 second/10 minute gel strengths in pascals; LSV=Brookfield low shear viscosity at 0.3 revolutions per minute, in pascal seconds.

The plastic viscosity, yield point, and gel strengths were obtained by the procedures set forth in API's Recommended Practice 13B-1.

Various brines are used in the examples, as follows: Brine I is a 1524 kg/m³ calcium bromide brine containing approximately 31.9 weight % of $CaBr_2$; Brine II is a 2304 kg/m³ zinc bromide/calcium bromide brine containing approximately 52.8 weight % of $ZnBr_2$ and 22.8 weight % of $CaBr_2$; Brine III is a 1812 kg/m³ $CaCl_2/CaBr_2$ brine containing approximately 18.8 weight % of $CaCl_2$ and 42.3 weight % $CaBr_2$; Brine IV is a 1704 kg/m³ $CaBr_2$ brine containing approximately 42.9% $CaBr_2$; Brine V is a 1644 kg/m³ $CaBr_2$ brine containing approximately 40.7% $CaBr_2$.

Three sized calcium carbonate bridging agents have been used in the examples, the particles of which have the particle size distribution set forth hereinbelow.

| BRIDGING AGENTS | | | | | | |
|---|---|---|---|---|---|---|
| Particle Size Distribution % of Particles Less Than | | | | | | |
| No. | 5 μm | 10 μm | 20 μm | 30 μm | 44 μm | 74 μm |
| I | 30.4 | 52.0 | 72.8 | 86.4 | 95.2 | 98.4 |
| II | 35.3 | 58.7 | 77.3 | 88.6 | 96.0 | 98.7 |
| III | 35.7 | 59.2 | 77.7 | 88.8 | 96.0 | 98.7 |

The fluid loss control additives used in the examples are as follows. Fluid Loss Control Additive No. 1 is an epichlorohydrin crosslinked hydroxypropyl ether derivative of corn starch prepared by reacting epichlorohydrin in a basic suspension of waxy corn starch until the viscosity reached about 90% of the maximum attainable viscosity, and thereafter reacting the crosslinked starch with propylene oxide such that the starch derivative contained about 1.3% by weight reacted propylene oxide (see for example U.S. Pat. No. 4,822,500, incorporated herein by reference). Fluid Loss Control Additive No. 2 is the corresponding epichlorohydrin crosslinked hydroxypropyl ether derivative of a hydrolyzed corn starch wherein the waxy corn starch was first partially hydrolyzed (depolymerized) with anhydrous hydrogen chloride gas until the Low Shear Viscosity of an aqueous slurry of the modified starch at a concentration of 120 kg/m³ and a pH, of 7 was decreased by 75% (i.e., the viscosity of the slurry containing the depolymerized starch was 25% of the viscosity of a slurry containing 120 kg/m³ of the unmodified waxy corn starch). Fluid Loss Control Additive No. 3 is the partially hydrolyzed (depolymerized) epichlorohydrin crosslinked hydroxypropyl ether derivative of waxy corn starch, Fluid Loss Control Additive No. 1, wherein the FLCA No. 1 was treated with anhydrous hydrogen chloride gas until the Low Shear Viscosity of a water slurry of the partially depolymerized starch derivative at a concentration of 60 kg/m³ and a pH of 7 was decreased by 28% (i.e., the viscosity of the slurry containing the partially depolymerized starch derivative was 72% of the viscosity of a slurry containing 60 kg/m³ of the modified FLCA No. 1).

EXAMPLE 1

3.25 g. of FLCA No. 1 and 7.0 g. of FLCA No. 2 were dispersed in 177 cc. of Brine I. To this while mixing were added 163 cc. of Brine II, 5.0 g. magnesium oxide buffer, 3.0 g. Cab-O-Sil M5 silica viscosifier, 25.0 g. Bridging Agent No. 1, and 0.75 g. Rhodopol 23 P xanthan gum viscosifier. Thus the fluid was a 1920 kg/m³ $CaBr_2/ZnBr$ fluid containing 9.3 kg/m³ FLCA No. 1, 20.0 kg/m³ FLCA No. 2, 8.5 kg/m³ silica viscosifier, 2.14 kg/m³ xanthan gum biopolymer viscosifier, 14.3 kg/m³ magnesium oxide buffer, and 71.4 kg/m³ Bridging Agent No. 1. The rheological, fluid loss and pH characteristics of the fluid were evaluated initially and after hot rolling the fluid at 82.2° C. for 16 hours. The data obtained are given in Table A.

EXAMPLE 2

3.0 g. of FLCA No. 1 and 6.0 g. of FLCA No. 2 were dispersed in 155 cc of Brine I. To this slurry while mixing were added 185 cc. of Brine III, 0.5 g. MgO, 0.5 g. Cab-O-Sil M5 silica viscosifier, 30 g. Bridging Agent No. 2, and 1 g. Rhodopol 23 P xanthan gum viscosifier. The fluid was evaluated as in Example 1. The data obtained are given in Table A.

EXAMPLES 3–6

6.0 g of FLCA No. 2 and 3.0 g of FLCA No. 1 were dispersed in 110 cc. of Brine I. To this while mixing were added 230 cc. of Brine IV, 0.5 g MgO, 2.0 g Cab-O-Sil M5 silica viscosifier, 32.0 g Bridging Agent No. 3, and the concentration of xanthan gum biopolymer indicated in Table B. The rheological characteristics of the fluids were evaluated initially and after static aging of the fluids at 82.2° C. for 16 hours. The data obtained are given in Table B.

EXAMPLE 7

8.75 g of FLCA No. 3 were dispersed in 150 cc of Brine I. To this slurry while mixing were added 190 cc of Brine IV, 0.5 g MgO, 5.0 g Cab-O-Sil M5 silica, 2 cc diethyleneglycol, 1.25 g xanthan gum, and 30 g of Bridging Agent No. 2. The Low Shear Viscosity of the fluid was initially 133 Pa·s, and after hot rolling at 82.2° C. for 16 hours was 110.9 Pa·s.

EXAMPLE 8

Example 7 was repeated except only 5.0 g of FLCA No. 3 was used, and 3.75 g of FLCA No. 1 was added. The Low Shear Viscosity of the fluid was initially 136.5 Pa·s, and after hot rolling at 82.2° C. for 16 hours was 116 Pa·s.

EXAMPLE 9

7.0g of FLCA No.2 and 0.75g of ACTIGUM C56DF, a scleroglucan biopolymer, were dispersed in 340 cc of Brine V. To this while mixing were added 1.0 g magnesium oxide buffer, 1.0 g of Cab-O-Sil M5 silica, and 32.0 g of Bridging Agent No. 2. Thus the fluid was a 1680 kg/m³ $CaBr_2$ fluid containing 20.0 kg/m³ FLCA No. 2, 2.85 kg/m³ silica viscosifier, 2.14 kg/m³ scleroglucan biopolymer viscosifier, 2.85 kg/m³ magnesium oxide buffer and 91.4 kg/m³ Bridging Agent No. 2. Certain characteristics of the fluid were evaluated initially, after hot rolling at 82.2° C. for 16 hours, and after static aging of the fluid at 82.2° C. for 16 hours. The data obtained are given in Table C.

TABLE A

|  | Example 1 | Example 2 |
|---|---|---|
| Brine, kg/m³ | 1920 | 1680 |
| Silica Viscosifier, kg/m³ | 8.5 | 1.43 |
| Xanthan Gum, kg/m³ | 2.14 | 2.86 |
| FLCA No. 1, kg/m³ | 9.3 | 8.6 |
| FLCA No. 2, kg/m³ | 20.0 | 17.1 |
| Magnesium Oxide, kg/m³ | 14.3 | 1.43 |
| Bridging Agent No. 1, kg/m³ | 71.4 | 0 |
| Bridging Agent No. 2, kg/m³ | 0 | 85.7 |
| INITIAL PROPERTIES |  |  |
| PV | 0.065 | 0.050 |
| YP | 30.64 | 13.88 |
| 10 Sec. GS | 3.35 | 3.83 |
| 10 Min. GS | 5.75 | 4.31 |
| LSV | 20.8 | 23.6 |
| pH | 4.4 | 6.6 |
| Spurt Loss @ 110° C., cc | 0 | — |
| Fluid Loss @ 110° C., cc | 3 | — |
| PROPERTIES AFTER HOT ROLL AT 82.2° C. FOR 16 HOURS |  |  |
| PV | 0.076 | 0.096 |
| YP | 25.86 | 31.12 |
| 10 Sec. GS | 38.3 | 67.0 |
| 10 Min. GS | 47.9 | 76.6 |
| LSV | 16.5 | 24.1 |
| pH | 4.8 | 6.2 |
| Spurt Loss @ 110° C., cc | 0 | 0 |
| Fluid Loss @ 110° C., cc | 0 | 0 |

TABLE B

FLUID FORMULATION: 1645 kg/m³ $CaBr_2$ Brine, 8.5 kg/m³ FLCA No. 1, 17.1 kg/m³ FLCA No. 2, 5.7 kg/m³ Cab-O-Sil M5 Silica, Indicated Concentration of Xanthan Gum, 1.43 kg/m³ MgO, and 91.4 kg/m³ of Bridging Agent No. 3.

|  | Example 3 | Example 4 | Example 5 | Example 6 |
|---|---|---|---|---|
| Xanthan Gum, kg/m³ | 0.71 | 1.43 | 2.14 | 2.86 |
| INITIAL PROPERTIES |  |  |  |  |
| PV | 0.047 | 0.059 | 0.058 | 0.060 |
| YP | 13.41 | 23.46 | 27.29 | 39.74 |
| 10 Sec. GS | 3.35 | 3.83 | 3.83 | 4.79 |
| 10 Min. GS | 5.27 | 5.75 | 6.22 | 7.66 |
| pH | 7.6 | 7.6 | 7.7 | 7.1 |
| LSV | 18.8 | 24.3 | 38.4 | 42.4 |
| PROPERTIES AFTER STATIC AGING AT 82.2° C. FOR 16 HOURS |  |  |  |  |
| PV | 0.048 | 0.057 | 0.065 | 0.065 |
| YP | 14.36 | 18.67 | 27.77 | 23.94 |
| 10 Sec. GS | 3.35 | 3.83 | 4.31 | 4.79 |
| 10 Min. GS | 5.75 | 5.27 | 5.75 | 7.18 |
| pH | 5.7 | 5.8 | 6.0 | 5.9 |
| LSV | 20.6 | 21.8 | 26.0 | 41.3 |

TABLE C

FLUID FORMULATION: 1680 kg/m³ CaBr₂ Brine, 20 kg/m³ FLCA No. 2, 2.85 kg/m³ Cab-O-Sil M5 Fumed Silica, 2.14 kg/m³ Scleroglucan Biopolymer, 2.85 kg/m³ MgO, and 91.4 kg/m³ Bridging Agent No. 2.

|  | Initial Properties | After Hot Rolling @ 82.2° C. for 16 Hours | After Static Aging @ 82.2° C. for 16 Hours |
|---|---|---|---|
| PV | 0.033 | 0.041 | 0.031 |
| YP | 10.05 | 10.05 | 9.1 |
| 10 Sec. GS | 2.39 | 2.39 | 3.35 |
| 10 Min. GS | 3.83 | 2.87 | 3.83 |
| pH | 7.3 | 7.36 | 7.38 |
| LSV | 8.3 | 12.2 | 12.6 |
| Spurt Loss @ 82.2° C. | — | — | 3.0 |
| Fluid Loss @ 82.2° C. | — | — | 5.5 |

What is claimed is:

1. In a brine based well drilling and servicing fluid which comprises a brine having dissolved therein a salt selected from the group consisting of calcium bromide, zinc bromide, calcium chloride, sodium formate, potassium formate, and mixtures thereof, and, optionally, one or more additional water soluble salts, the brine having a density from about 1200 kg/m³ to about 2400 kg/m³, a viscosifier, a fluid loss control additive, and a bridging agent selected from the group consisting of water soluble, particulate salts which are not appreciably soluble in the brine, acid soluble materials, and mixtures thereof, the improvement which comprises utilizing as the viscosifier (1) an amorphous silica having an ultimate particle size less than 100 millimicrons and (2) a biopolymer, wherein the weight ratio of silica to biopolymer is from 0.5 to 8.

2. The fluid of claim 1 wherein the fluid loss additive is selected from the group consisting of starch derivatives, cellulose derivatives, lignocellulose derivatives, and mixtures thereof.

3. The fluid of claim 1 wherein the fluid loss additive is a starch ether derivative.

4. The fluid of claim 1 wherein the fluid loss additive is a starch ether derivative selected from the group consisting of hydroxyethyl starch, hydroxypropyl starch, dihydroxypropyl starch, carboxymethyl starch, hydroxyalkyl carboxymethyl starch, cationic starch, and the crosslinked derivatives thereof having about one crosslink per 200 to 1000 anhydroglucose units in the starch derivative, and mixtures thereof.

5. The fluid of claim 4 wherein the starch ether derivative is derived from a starch which has been partially hydrolyzed to decrease the molecular weight of the starch or wherein the starch ether derivative has been partially depolymerized to decrease the molecular weight thereof.

6. The fluid of claim 3, 4, or 5 wherein the fluid contains from about 1.4 to about 14.3 kg/m³ of the silica viscosifier, from about 0.7 to about 8.6 kg/m³ of the biopolymer, from about 8.5 to about 42.8 kg/m³ of the fluid loss control additive, from about 28.6 to about 143 kg/m³ of the bridging agent, from 0 to about 28.6 kg/m³ of an alkaline buffer, and from 0 to about 42.8 kg/m³ of a polar additive.

7. The fluid of claim 1, 3, 4, or 5 wherein the silica is a fumed silica and the biopolymer is a xanthan gum.

8. The fluid of claim 6 wherein the silica is a fumed silica and the biopolymer is a xanthan gum.

9. The fluid of claim 8 wherein the bridging agent is selected from the group consisting of sodium chloride, calcium carbonate, and mixtures thereof.

10. The fluid of claim 9 wherein the alkaline buffer is selected from the group consisting of magnesium oxide, magnesium hydroxide, calcium oxide, calcium hydroxide, zinc oxide, zinc hydroxide, and mixtures thereof, and wherein the polar additive has the empirical formula, HO—$C_aH_{2a}$—Z, where a is an integer from 1 to about 5, and Z is a radical selected from the group consisting of H and $(OC_bH_{2b})_nOR$, where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5, and y is an integer from 1 to 3.

* * * * *